Figure 1:
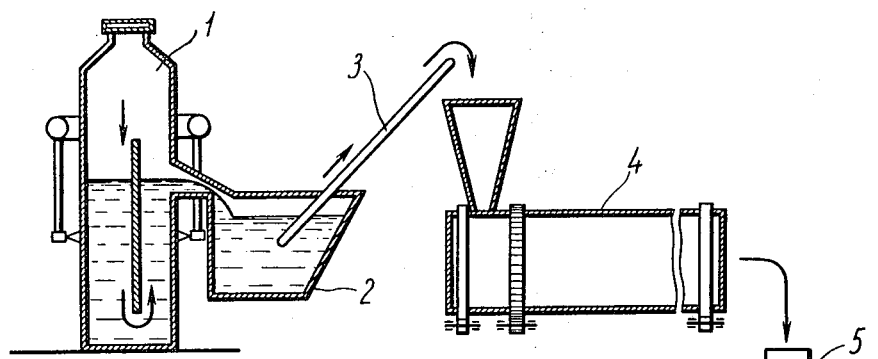

United States Patent [19]
Bondarev et al.

[11] 3,915,732

[45] Oct. 28, 1975

[54] METHOD OF PRODUCING WHITE FILLER FOR HARDENING CONSTRUCTION MIXTURES

[76] Inventors: Konstantin Timofeevich Bondarev, Nizhnyaya Pervomaiskaya ulitsa, 33, kv. 171; Isai Davidovich Tykachinsky, ulitsa Fadeeva, 6, kv. 140; Nikolai Mikheevich Pavlushkin, ulitsa Gotvalda, 14, kv. 44, all of Moscow; Viktor Stepanovich Kozlovsky, Dolgoprudny, ulitsa Teatralnaya, 6a, kv. 22, Moskovskaya oblast; Valentin Feoktistovich Krylov, ulitsa Kropotkina, 24/1, kv. 14, Moscow, all of U.S.S.R.

[22] Filed: Sept. 25, 1972

[21] Appl. No.: 292,168

[52] U.S. Cl.................. 106/288 B; 106/40; 264/43
[51] Int. Cl.² .......................................... C04B 31/02
[58] Field of Search........... 106/288 B, 117, 40, 51; 264/43; 65/19, 20

[56] References Cited
UNITED STATES PATENTS

| | | | |
|---|---|---|---|
| 1,962,270 | 6/1934 | Dunn | 106/51 |
| 2,017,889 | 10/1935 | Bowyer | 65/20 |
| 3,684,539 | 8/1972 | Bartholomew | 106/117 |

*Primary Examiner*—Patrick P. Garvin
*Assistant Examiner*—J. V. Howard
*Attorney, Agent, or Firm*—Haseltine, Lake & Waters

[57] ABSTRACT

In the production of a white filler, to prepare a molten vitrous mass, a molten metallurgical slag is mixed with mineral additives and founded at some 1,560°–1,580°C with simultaneous foaming at the oxidation burning of a fuel torch in the melt; the obtained foamed vitrous mass is then fed for granulation at a viscosity of 60–90 poises, and thermal treatment of the obtained granulated product is effected at some 1,050°–1,080°C for not less than 30 min.

1 Claim, 2 Drawing Figures

METHOD OF PRODUCING WHITE FILLER FOR HARDENING CONSTRUCTION MIXTURES

The invention relates to method of producing a white filler for preparing hardening construction mixes that can be used for road construction, production of pressure pipes, construction concrete, putting up water purification filters, etc.

Currently known is the method of producing a white filler, consisting in preparing a molten vitreous mass in a rotary furnace from a dross fed as a suspension of sand, chalkstone and soda in water, said mass being saturated therein with high-silica sand.

The aggregate material obtained in the form of the glass melt saturated with high-silica sand is granulated in a plate granulator. Lumps of the granulated aggregate material are ground, sorted according to fractions and fed into the rotary furnace for thermal treatment.

As a result of the thermal treatment of the granules in the course of their rotary-progressive motion, the material is devitrified, with white granules obtained as the final product. The crystallized aggregate material is crushed thereafter, its pieces cracking along the less durable cleavages of sand with glass and thus acquiring the shape of cubic granules.

White granules are used as a covering material in road construction (cf. British Pat. Nos. 1,035,797, 992,782 cl. CIM, 897-125 cl. 56 m).

A disadvantage of the known method is the necessity of provision of metal-consuming, large-size and costly equipment in the form of two rotary furnaces 120 m long and 2.5 m in diameter for producing a molten vitreous mass and the thermal treatment of the material. Therefore, the known method is of low efficiency and fails to ensure the production of a material uniform in structure.

Moreover, the production of a man-made filler for construction mixes used en masse calls for large quantities of glass raw material, which is not economical, as such raw material is essentially used for the preparation of a more valuable material, namely, glass proper.

To turn a glass raw material (sand, dolomite, chalkstone and soda) into a water dross, an extra operation plus large-size bulky equipment (ball mills, mixers, vessels, pumps, etc.) are required.

The most essential disadvantage of that method is that it fails to ensure the treatment of such common raw material as the refuse of metallurgical industry in the form of fused or cold slag.

It is an object of the invention to provide a method of producing a white filler for hardening construction mixes with the use of such operations and their parameters, as would help simplify the technological process as a whole, making it more efficient, utilizing such non-deficit complex material as metallurgical fused or cold slag, to produce a structurally uniform material which is white in colour.

This and other objects of the invention have been achieved in that, when producing a white filler for hardening construction mixes through the preparation of a glassy melt its granulation and subsequent thermal treatment of the granules in the course of their rotary-progressive motion, according to the invention, in order to prepare the glassy melt, the molten metallurgical slag is mixed with mineral additives and then founded at some 1,560°–1,580°C with simultaneous foaming due to oxidation burning of a fuel torch in the melt; the thus prepared foamed mass is fed for granulation at a viscosity of 60–90 poises, thermal treatment of the granulate being effected at some 1,050°–1,080°C for not less than 30 min.

The essence of the proposed invention is as follows. The preparation of the molten vitreous mass, through mixing molten metallurgical slag with mineral additives and founding at 1,560°–1,580°C with a simultaneous foaming due to oxidation burning of a fuel torch in the melt, permits to utilize non-deficit complex raw material in the form of metallurgical refuse instead of glass raw materials and avoid operations involving the preparation of a charge for producing the glass melt.

The method permits to control the process of pore formation complying with a preset type of pores and volume weight of the final product. The porosity of the material can be varied from 5 to 80 %.

Under the proposed method, foaming and founding take place at the same time, which helps simplify the process as a whole and thus raise efficiency.

The molten vitreous mass prepared under the proposed method is devitrified during the thermal treatment in its volume with a resultant formation of crystals not more than 1 micron in size, which permits to obtain a uniform material.

Intensive founding occurs in a high efficiency cyclone, convertor or in vortex smelting chambers. These furnaces, simple in design, help raise the efficiency up to 500 tons per day with a daily output of 25 to 30 tons of glass melt from one square metre of cross-section when using cold slag, and up to 40 to 50 tons when using fused slag.

The furnaces stand out for their small size and do not require a fire-proof lining, while one-time expenditures for their construction are not big.

The founding of the molten mass is directly effected by the oxidation burning of a fuel torch in the mass.

This helps secure a high pyrometric effect of fuel burning, intensive mixing and saturation of the mass with gases.

The oxidizing atmosphere of the founding helps burn out sulphide sulfur present in metallurgic slags and obtain the white material in the long run.

Such founding permits to essentially reduce heat expenditures and produce a gas-saturated, structurally uniform material.

The foaming of the molten vitreous mass during founding in the furnaces is done either by introducing a blowing agent through a torch sunk into the melt or without a blowing agent at all.

In the last instance, foaming is effected through hydrostatic saturation of the melt with the products of the fuel burning.

The introduction of a blowing agent helps produce a light material with a volume weight of less than 1000 kg/m$^3$.

To produce a filler, foaming is done through hydrostatic saturation of the melt with gases.

This type of foaming is characterized by an efficient formation of closed pores essential to the filler.

The provision for the hydrostatic foaming of the molten vitreous mass in the course of foaming permits to efficiently and quickly saturate the mass in a required volume with solved gases by varying the level of the molten vitreous mass in a founding unit, automatic regulation of the temperature, air and gas pressure in the torch sunk in the melt, varying the extent of saturation, as well as by effecting the founding and gas saturation of the silicate melt in a heavily oxidized atmosphere especially required for burning out the sulphide sulfur when utilizing a sulphide raw material (blast-furnace slag, etc.). This makes it possible to produce a white material on the basis of blast-furnace slag.

The viscosity of the molten mass in founding should be maintained at 60 to 90 poises, which ensures better foaming and maintenance of the gas within closed volumes in the vitrous mass; however, prior to granulation, the viscosity of the foamed melt reaches 60–90 poises due to the reduced temperature. Owing to this, the gas saturation of the molten vitreous mass is maintained as required and closed pores are formed in quantities of not less than 30 %.

As a result of the granulation of the foamed molten mass with a viscosity of 60–90 poises, the filler possesses a preset volume weight and porosity.

The granules are treated at some 1,050°–1,080°C for not less than 30 min. Such treatment ensures uniform volume crystallization of all the material. In its turn, such crystallization helps obtain a uniform fine-crystal structure of the foamed molten mass and increases the strength of the material as a whole.

Usable as a raw material can be metallurgical slags, basic blast-furnace slags in cold or fused state, refused in the production of conversion pig iron.

Usable as mineral additives for specifying the chemical composition of the molten vitreous mass are sand and alkalis.

When producing a filler coloured en masse, dyes should be used in the form of oxides of heavy metals ($CO_2O_3$ ; $Cr_2O_3$ ; NiO, etc.).

Raw materials are not subject to special treatment (crushing, grinding, mixing, etc.).

Slag in pieces is melted in a cyclone chamber or convertor, correcting additives being added to the melt.

Figure 2:
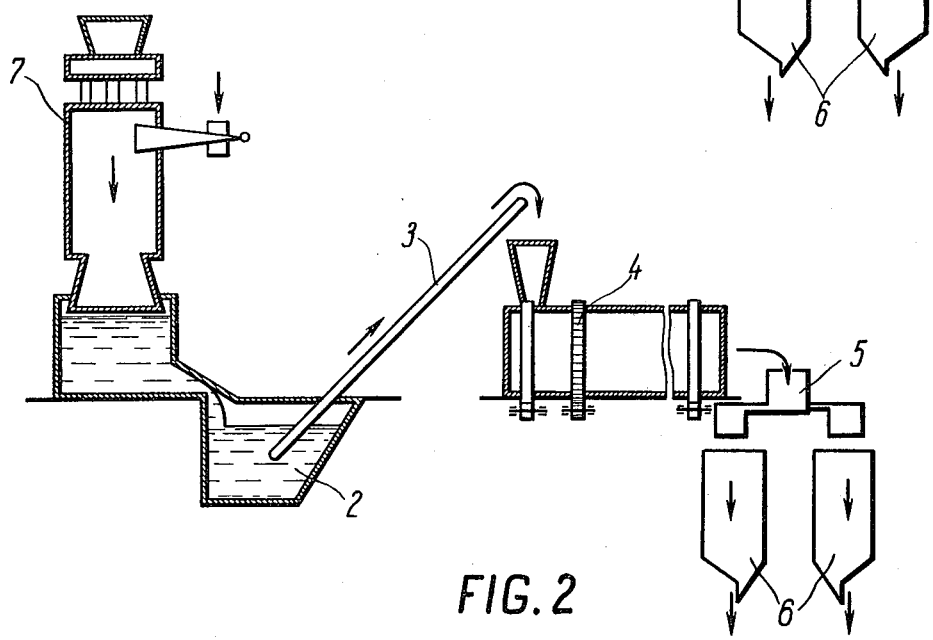

The invention will be more apparent from the drawings appended to the description, wherein:

FIG. 1 schematically shows an arrangement for producing a white filler, according to the invention, with the use of a convertor;

FIG. 2 is a similar arrangement, use being made of a cyclone chamber.

In the following, various modes will be described and exemplified according to which a white filler for hardening construction mixes can be produced in accordance with the present invention.

EXAMPLE 1

For preparation of a white filler for hardening constructional mixes, a cold blast-furnace slag is charged into a continuous-action convertor 1 (FIG. 1) and melted. The molten vitreous mass is mixed with mineral additives (broken glass and sand). Raw materials, i.e., blast-furnace slag, sand and broken glass are taken in a ratio of 7 : 6 : 1, respectively.

The melting of cold blast-furnace slag and its mixing with correctional additives is carried out at 1560-1580°-C.

The founding of the glass is effected at the same temperature of 1,560°–1,580°C. For fuel burn, the air is heated in a recuperator to 600°C. Owing to the oxidation burning of the fuel, sulphide sulfur is burned out from the melt. This helps produce a white filler on the basis of blast-furnace slag. At the same time, foaming is done in the course of founding, owing to the hydrostatic saturation of the vitreous mass, with gases resultant from the burning of the fuel in it.

The foamed mass is let out as a continuous stream into a granulator 2.

The viscosity of the molten mass is maintained at 60 to 90 poises, which permits to prepare the mass with a porosity of 30 % and a volume weight of 1,100 kg/m³.

The granulation of the stream of the foamed vitrous mass, heated to 1,560°–1,580°C, is effected through its sharp cooling with water, and pieces of the material, varying in shape, are supplied into a continuous-action rotary furnace 4 with the aid of a scraper carrier.

The thermal treatment of granules from the porous vitreous mass is done in the furnace 4. The cold granules are heated to 1,050°C in the course of a rotary-progressive motion and thus soaked for 30 min.

The glass-crystal white filler produced in such a way is subjected to crushing in a crusher 5, sorted and then fed into distributing bins 6 for ready product storage.

EXAMPLE 2

The material is produced under the same conditions as those mentioned in example 1, but the melting of a cold metallurgical slag and its mixing with mineral additives, the founding and the frothing are effected in a continuous-action cyclone smelting chamber 7 (FIG. 2).

EXAMPLE 3

The material in the form of a white filler is produced under the conditions as those described in examples 1 and 2, but the blast-furnace slag is utilized in a fused condition. The slag is poured from a slag-carrying pot (not shown) into a converter at 1,350°C, heated to 1,580°C, mixed with correcting additives and then foamed.

EXAMPLE 4

The material in the form of a white filler is produced under conditions identical with those mentioned in examples 1, 2 and 3, but to produce the material coloured en masse, dyes in the form of oxides NiO, CoO, $Cr_2O_3$ and others are introduced into the furnace in succession.

The material obtained through the proposed method has the following characteristics:

| | | |
|---|---|---|
| specific weight | | 2.43 g/cm³ |
| volume weight | | 1.0–1.5 g/cm³ |
| coefficient of thermal expansion | | 54 . $10^{-7}$ 1/deg |
| compression strength | | over 6500 kg/cm² |
| closed porosity | | 5–27 % |
| water absorption | | 1.2 % |
| chemical stability | | |
| loss of weight | in water | 0.07 % |
| | in alkali | 2.33 % |
| | in acid | 0.11 % |

The proposed method of producing a white or coloured filler is characterized in that it permits to produce a white or coloured filler for industrial road and other construction through a continuous method on a compact high-production (20-40 t/h) line from metallurgical slag.

What we claim is:

1. A method of producing a white filler for hardening construction mixes, comprising the following operations: founding a molten vitreous mass at some 1,560° to 1,580°C with simultaneous foaming, in the course of oxidation burning of a fuel torch in the vitreous mass, granulating the obtained foamed vitreous mass at a viscosity of 60 to 90 poises, introducing said granulated vitreous mass into a rotary furnace so as to impart progressive rotational motion thereto, and thermally treating the obtained granules during their progressive rotational motion at some 1,050° to 1,080°C for not less than 30 minutes.

* * * * *